United States Patent [19]
Nelson

[11] 3,867,039
[45] Feb. 18, 1975

[54] COLOR MONITOR FOR CONTINUOUS PROCESS CONTROL

[75] Inventor: John R. Nelson, Houston, Tex.

[73] Assignee: Petty-Ray Geophysical, Inc., Houston, Tex.

[22] Filed: Oct. 25, 1973

[21] Appl. No.: 409,670

Related U.S. Application Data

[63] Continuation-in-part of Ser. No. 134,366, April 15, 1971, abandoned.

[52] U.S. Cl.............. 356/178, 250/226, 209/111.6, 235/195
[51] Int. Cl............................................. G01j 3/50
[58] Field of Search........................... 356/173–195; 250/226; 209/111.5, 111.6; 235/195

[56] References Cited
UNITED STATES PATENTS

| | | | |
|---|---|---|---|
| 3,432,243 | 3/1969 | Hardesty | 356/236 X |
| 3,547,541 | 12/1970 | Varnella | 250/226 X |
| 3,679,314 | 7/1972 | Mustert | 250/226 X |

OTHER PUBLICATIONS

Schlotzer, Review of Scientific Instrum., Vol. 36, No. 9, Sept. 1965, pp. 1350–1352.

Lewis, American Dyestuff Reporter, July 20, 1964, pp. 30–35.

Mead et al., Nuclear Instrum. & Methods, Vol. 36, (1965) pp. 13–22.

*Primary Examiner*—Robert J. Webster
*Attorney, Agent, or Firm*—Arnold, White & Durkee

[57] ABSTRACT

Apparatus and methods for continuously monitoring small changes in the color of products with respect to a preselected color or range of colors and for supplying an output signal in response to such changes. An optical synchronizing system provides an image representative of the integrated value of the light energies reflected from the product at two selected wavelengths to respective photomultiplier tubes to compensate for variations in product size, and the like within the viewed product area, and the outputs of the two photomultiplier tubes are divided one by the other to produce a true color ratio signal compensated for variations in intensity of the light illuminating the product. Output color ratio signals may be employed to control a process that is varying the tint or color of the product, or to control the separation of objects according to slight variations in their color.

15 Claims, 8 Drawing Figures

FIG_6

FIG_7

FIG_8

3,867,039

COLOR MONITOR FOR CONTINUOUS PROCESS CONTROL

BACKGROUND OF THE INVENTION

This is a continuation-in-part application entitled to the benefits of the filing date of applicant's prior copending application Ser. No. 134,366 filed Apr. 15, 1971, now abandoned.

The present invention is related to color responsive devices, and, more particularly, to apparatus and methods for monitoring a deviation in the color or tint of a selected product and providing an output signal indicative of the deviation in the product's color from a preselected color, regardless of ambient light brightness variations.

There has long been a demand for apparatus and methods for controlling the color of a product during its processing. Such control may be desired for color matching, for determining the degree of preparation of a product as when dying, roasting, baking, blending, sorting, etc., or simply for providing a consistent color between product batches.

Many prior art systems for accomplishing a color match have required the physical removal of a product sample from the process environment for the making of color comparisons by means of bench type equipment. Obviously, such approaches are cumbersome, time consuming, and generally unsuited to continuous process control, as the results are not available in real time.

Other prior art systems have required that the viewed portion of the product be at rest with respect to the viewing system in order for the color comparison to be made, such as in apparatus for determining the authenticity of paper currency.

Still other prior art systems have attempted to provide semi-continuous color monitoring by switching back and forth between viewing a moving product and a stationery standard, but these systems have been useful only where the moving product was uniformly colored over the entire area being viewed.

The apparatus heretofore available for continuous monitoring of product color have been unsuited to applications in which a moving stream of nonuniformly colored product must be viewed, and particularly to systems in which sensitivity to slight changes in product color is required. Furthermore, the sensitivity of such apparatus to variations in illumination incident on the product, to variations in size of the product elements being viewed, and to the location of the product elements with respect to the viewing apparatus, has been unacceptable in many applications.

SUMMARY OF THE INVENTION

The present invention provides apparatus and methods for continuously monitoring the color of a product, even when the product elements are nonuniform in color, size, shape, and location, and the product is moving with respect to the color monitoring apparatus, and for producing an output signal that is sensitive to small variations in product color.

In one aspect, the present invention provides electro-optical means for viewing a product and generating electrical output signals representative of the intensities of its color at two selected wavelengths in the optical spectrum, together with electronic control means for determining the ratio of the two signals and generating a control signal responsive to the occurrence of slight variations in the color of the product.

In another aspect, the optical viewing system includes a pair of coaxially disposed lens systems for continuously providing high efficiency diffuse images at two selected wavelengths to corresponding photoelectric sensors, by use of a suitable beam splitter and filters. These images represent the respective levels of light energy reflected at the two wavelengths from the same viewed area of the product at any given instant in time.

Further in accordance with this invention, the color of a product is continuously monitored by forming a first optical beam having a viewed area of the product as its object and having an image in focus at a first image plane, defining the viewed area at the first image plane, forming a second optical beam having its object plane at a point along the first optical beam where the viewed product image is diffuse, splitting the second optical beam into two separate beams, filtering each of the two split beams at respective selected wavelengths within the optical spectrum, focussing the two split beams on respective regions of best light collection of two corresponding photo-electric sensors, sensing the respective intensities of the two beams, and generating an output control signal representative of the true ratio of the respective intensities.

The color sensing apparatus and methods of this invention also may be utilized with many of the sorters presently available for performing a color sort operation, particularly when it is desired to distinguish between a large succession of gradually varying color shades or tints. A single invention apparatus may be provided per channel of such sorters, and successive values of the electrical output assigned to successive, separate sorting channels, so that the product can be separated into successive colors or color shades as it passes the optical viewer.

DESCRIPTION OF THE PREFERRED EMBODIMENTS

Many comestible products, such as, for example, peanuts, coffee beans, potato chips, cookies, pastries, catsup and the like, require roasting, baking, or blending to a select degree, which is generally accompanied, and thus represented, by a distinguishing color; for example, a selectable shade of brown, tan, yellow-brown, or red. The color shades in these cases are indications of the degree of preparation of the products. The degree of preparation of such products not only directly affects their taste and quality, but also their appearance. Many of these products may differ in size, shape, orientation, or location with respect to product viewing apparatus, as well as in color, within acceptable limits.

In addition, many agricultural commodities, such as tomatoes, fresh peeled peaches, pears, and the like, are advantageously sorted into under-ripe, ripe, and over-ripe before processing, so that sorted batches of the commodity may be subjected to appropriate conditions of temperature and time to achieve a uniform end product.

Further, in the manufacturing of paint, textiles, paper, tiles, and the like, it is desirable to maintain a constant color, minimizing any perceptible change in tint which would be objectionable to the eye.

The color of an area, when viewed, depends upon the intensity of the various colors which are reflected. By computing the ratio of the intensities between two specific colors, selected in accordance with the desired color of a particular product, means are provided for monitoring the color of the product. Any intensity change in either of the two selected colors, no matter how slight, will cause a change in the color ratio indicative of the difference, or deviation, in the product tint from the desired color.

The present invention provides means for viewing an illuminated product coupled to electro-optical transducer means for providing a pair of electrical outputs indicative of the intensities of light energy reflected from the product at two respective wavelengths (preselected colors). The electrical outputs are in synchronism in real time, that is, they represent simultaneous values of the reflected light energies at the two selected wavelengths, even when the viewed product is a moving, nonuniform sample. The synchronized electrical outputs are introduced, in turn, to a computing control circuit which determines their ratio. Any change in the ratio is reflected as an output signal variation by the computing control circuit. That variation may be displayed and/or variously employed as a feedback signal to regulate processing apparatus that is causing the change in color of the viewed product.

Figures 1, 3:
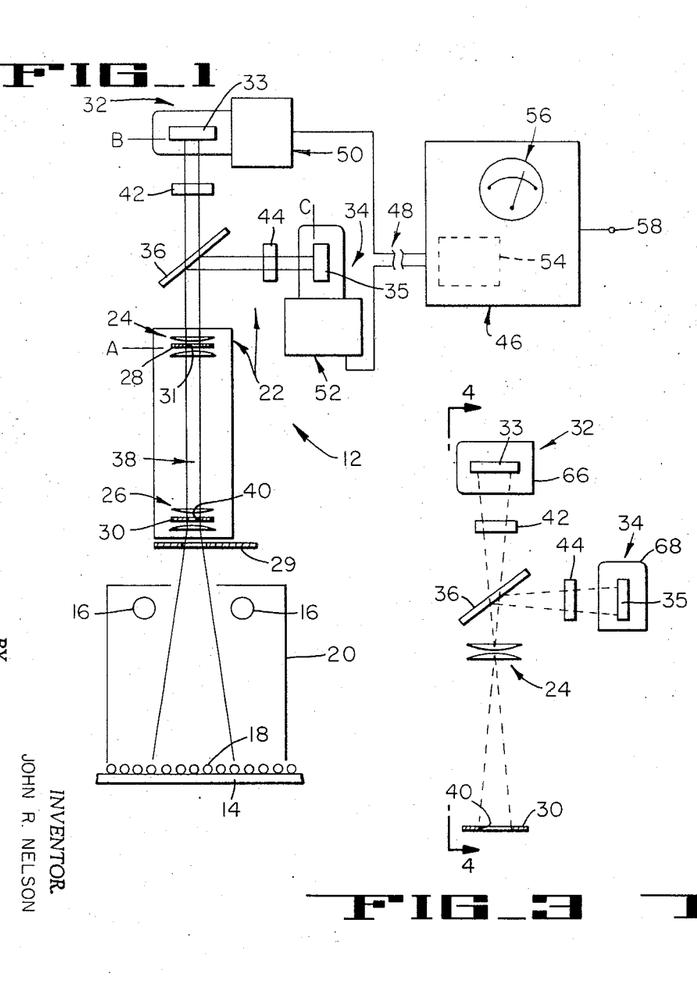
FIG. 1 is a simplified block and schematic diagram illustrating one embodiment of the invention.
FIG. 3 is a simplified elevation of the optics which form the optical synchronizing system of the embodiment of FIG. 1.

Referring now to FIG. 1, there is shown by way of illustration a basic color monitor system 12 in accordance with one embodiment of the invention. A product conveying apparatus, which may be a flume, an endless conveyor belt 14, or the like, is illuminated by a suitable light means 16, such as an incandescent or fluorescent light, or a combination of both types. The product 18 is shielded from large ambient light color changes, if present, by a shield member 20. The shield member 20 is not required for light brightness changes, as will be discussed below.

Electro-optical viewing means, generally indicated by reference numeral 22, includes a synchronizing lens system 24, coaxially spaced from an objective lens system 26. The lens systems 24, 26 are shown here as plano-convex doublet lens arrangements by way of example only. Optical frame members, or stops, 28, 30 are coaxially disposed within the lens systems 24, 26, respectively. The lens systems 24, 26, in conjunction with stops 28, 30, define a common coaxial optical system which forms an optical path 38, herein sometimes also referred to as a "viewing beam." The "beam" 38 is formed by light reflected from the product, and is shaped and directed by the optical portion of the electro-optical viewing means 22. An optical slide 29 may be selectively disposed in front of the objective lens system 26 to allow shutting off all light to the viewing means 22 for calibration of the system, as will be further discussed below.

The light collected from the product 18 by the objective lens system 26 is brought to focus at an image plane A, located within the (plano-convex doublet) synchronizing lens system 24, where the image of the product 18 is in focus. The optical frame member 28 is mounted in the image plane A to frame the image of the object 18. The frame member 28 is made of opaque material and has a center aperture 31 of a size and shape defining the area of the product 18 to be viewed by the system, and also limiting the field of view to eliminate unwanted light from outside of the desired viewing area.

A synchronizing optical frame member 30 is mounted within the (plano-convex doublet) objective lens system 26. Following the synchronizing lens system 24 and the optical frame member 28, a non-colored, semi-transparent mirror beam splitter 36 is mounted. The beam splitter 36 passes a portion of the light from the framed image plane A to a first photoelectric sensor or transducer means 32 and reflects the remaining portion of the light to a second photoelectric sensor or transducer means 35. The image defined by the aperture of the synchronizing frame member 30 is brought to focus by the synchronizing lens system 24 at image planes B and C, located at the photosensitive elements 33, 35 within the respective photoelectric sensors 32 and 34. The synchronizing frame member 30 is made of opaque material and has a center aperture 40 of a size and shape selected to focus the light beams on the respective "regions of best collection" of the photo-sensitive elements 33, 35, as will be further discussed below. Color filters 42, 44 are disposed in the respective beams between the beam splitter 36 and respective photo-electric sensors 32, 34.

Since the object of the synchronizing lens system is the area defined by the aperture 40 of synchronizing frame member 30, the light received by each of the photo-electric sensors 32, 34 is completely diffused, having no image characteristics of the product 18 or of the image frame member 28. Thus the invention monitors the tint of the product by computing the ratio of the instantaneous values of the intensities of reflected light at two specific wavelengths (wherein the two specific wavelengths depend upon the color of the product). The light intensities represent the energy reflected from the exact same area at the same instant in time, integrated over the viewed area to compensate for variations in light sensitivity across the photocathodes of, and between, the respective sensors. Each tint is represented by its own identifying difference ratio.

The characteristics, e.g., color wavelengths, of the filters 42, 44 are selected according to the color of the product to be monitored or sorted. By way of example only, assume that the product is potato chips which are being cooked as they are passed through a hot oil continuous cooker (not shown) on the conveyor belt 14. In this case, the filters 42, 44 are selected to pass specific narrow bands (wavelenths) of bluish-green and red light (496 and 676 nanometers, respectively). The ratio of bluish-green to red light reflected from a potato chip decreases with cooking time, that is, the intensity of the bluish-green light decreases at a greater rate than that of the red light, as the chips change in color from weak cream to strong tan during the hot oil cooking process. Accordingly, the thoroughness of cooking and the appearance of the potato chips may be regulated by monitoring and responding to the change in the bluish-green to red light ratio.

Figure 8:
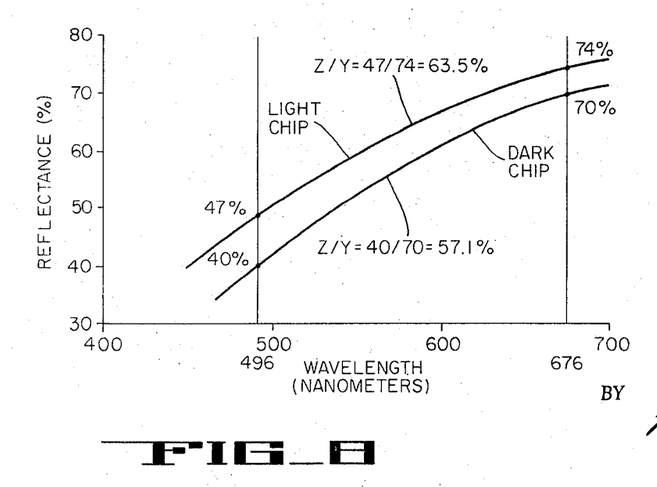
FIG. 8 is a graph of percent reflectance versus the change of color of potato chips, showing the definition of the ratios representing the tint of the product.

FIG. 8 shows by way of a spectrograph the change in color of potato chips during the cooking process relative to the color ratios generated by the apparatus of the invention. The spectrograph is generally self-explanatory; at the wavelength of the Z channel filter 42 (496 nanometers) a "light" chip (one that is undercooked) reflects 47 percent of the incident light; at the wavelength of the Y channel filter 44 (676 nanometers) it reflects 74 percent of the incident light. On the other hand, a "dark" chip (one which is overcooked) reflects 40 percent of the light at the wavelength of the Z channel filter 42, and 70 percent of the light at the wavelength of the Y channel filter 44. Accordingly, if a ratio Z/Y is measured while the chip is being cooked, it is equal to 47/74, or 0.635, for an undercooked chip, but is 40/70, or 0.571, for an overcooked chip. The difference between these ratios, $0.635 - 0.571 = 0.064$, is readily detected by apparatus in accordance with the invention, since it is readily set to provide full scale deflection with a 10 percent difference in ratios. Thus even deviations of the order of 0.1 percent readily are detected and displayed by apparatus in accordance with the present invention.

Figure 2:
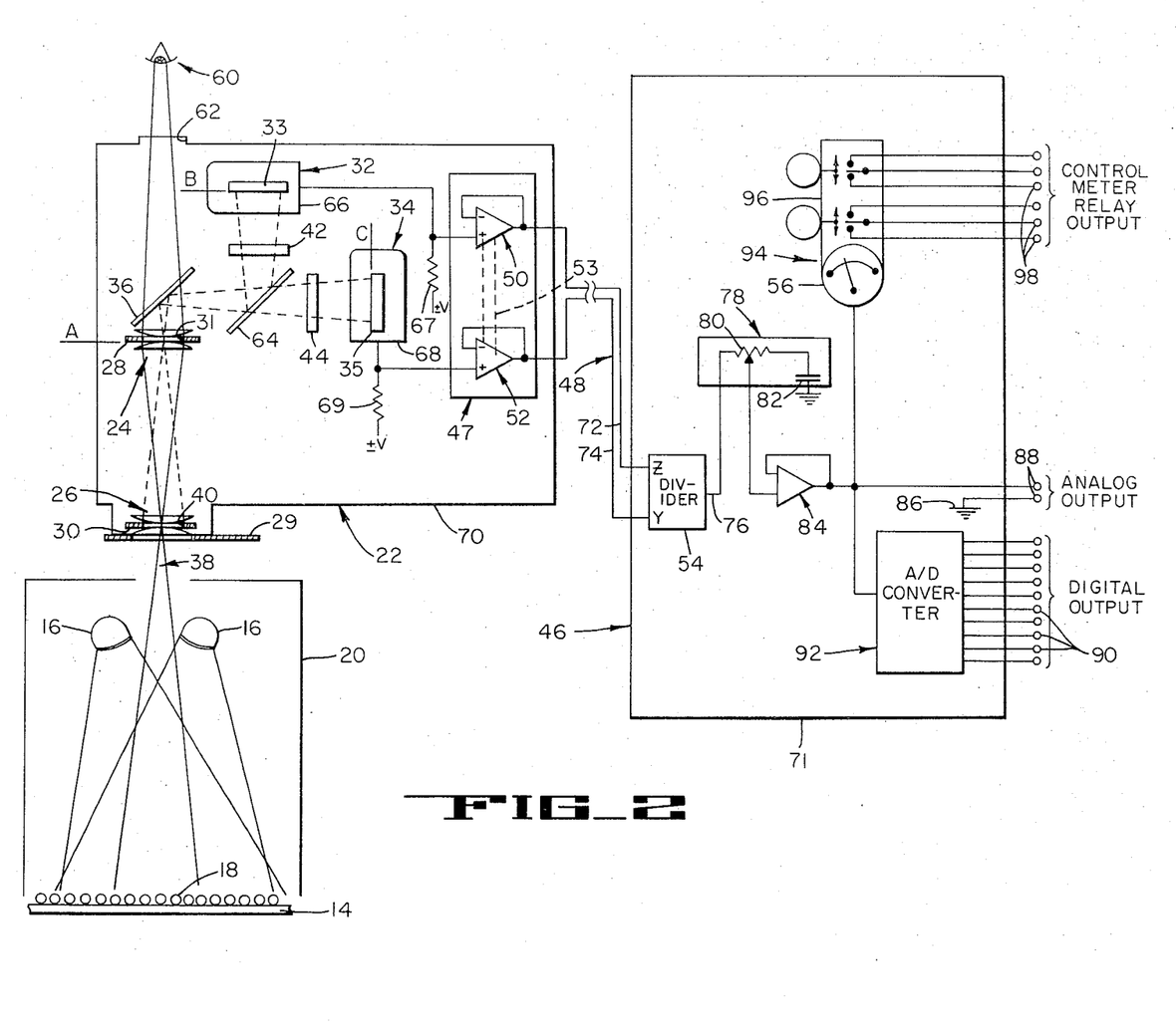
FIG. 2 is a block and schematic diagram illustrating in greater detail the diagram of FIG. 1, including modified optical and control output systems in accordance with another embodiment of the invention.

The electrical outputs from the photo-electric sensors 32, 34 (hereinafter for convenience termed "color signals") are proportional respectively to the intensity of the two color stimuli passed by the respective filters 42, 44. The color signals are introduced to an electronic computing control system, generally indicated herein by reference numeral 46, by low impedance output voltage follower line driver means 47 (FIG. 2) and a cable 48 of selectable length. The line driver means 47, further described below, includes a pair of 100 percent feedback circuits such as typified by the Fairchild 740 F.E.T. input operational amplifiers 50, 52, as depicted in FIG. 2, which provide a very low impedance output to the computing control system 46 regardless of variations in the length of the cable 48. The voltage follower operational amplifiers 50, 52 are thermocoupled by means of a metallic ring 53 (illustrated in phantom line) which compensates for internal drifts by minimizing temperature differences between the amplifiers.

The color signals from the electro-optical transducers 32, 34 are introduced to an analog multiplier/divider means, indicated by reference numeral 54, and further described below with reference to FIG. 2. The "divider" means 54 is a true analog ratio device, that is, the output signal value therefrom is a true ratio, or division, of the two color signals introduced thereto. Typical of the divider means 54 is the Model 107C, fabricated and sold by Hybrid Systems Corporation of Burlington, Mass. 01803. Since the two color signals introduced to the divider means 54 are representative of the intensities of the respective colors reflected from the product and passed by the filters 42, 44, it follows that the output (hereinafter termed the "color ratio signal") from the means 54 corresponds to the true ratio of the two colors. The color ratio signal is presented to signal display means 56, such as a suitable meter, and is also provided at output terminal means 58 in any of several selected formats, further described below.

FIG. 2 shows in greater detail an embodiment of the invention corresponding to the color monitor system 12 of FIG. 1, wherein like components are indicated by similar numbers. Accordingly, product 18 on conveyor belt 14 is viewed by the optical path 38 formed by the common coaxial optical system. A beam splitter 36 similar to that of FIG. 1 is disposed to intercept the optical path 38 to provide a first pair of reflected and transmitted light paths. The transmitted light path may be viewed by an operator as at 60 by way of a viewing aperture 62. In this embodiment the actual area on the belt 14 viewed by the optical path 38 is seen by the operator, and this view may be helpful to facilitate orienting the electro-optical viewing means 22 relative to the product 18. A second bean splitter 64 is provided in the reflected optical path to reflect a portion of the light energy from the product 18 through the first color filter 42 to a photo-multiplier tube 66 of the photo-electric sensor 32, and the remaining portion is transmitted through the second color filter 44 to a photomultiplier tube 68 of photo-electric sensor 34. As may be seen, the apparatus of FIG. 1 is a simplified version of that of FIG. 2, wherein the latter apparatus further includes means for allowing the operator to see the view encompassed by the optical path 38.

The electro-optical viewing means 22 is shown in FIG. 2 as disposed within a housing 70, and includes the line driver means 47 disposed to receive the output signals from the pair of photomultiplier tubes 66, 68 via respective load resistor means 67, 69. The line driver means 47 includes the operational amplifiers 50, 52 of previous mention which provide a very low impedance output. The color signals from the operational amplifiers 50, 52 are introduced to the computing control system 46 (shown disposed within a housing 71) as Z and Y inputs, respectively. The cable length is variable and is dictated by the distance of the control system 46 (housing 71) from the electro-optical viewing means 22 (housing 70). The color ratio signal seen on an output line 76 from the divider means 54 is equal to the ratio of (Z/Y). Any change in either color is reflected on line 76 as a change from the preset ratio of (Z/Y). On the other hand, any change in brightness levels would apply equally to both the Z and Y color signals and, accordingly, would be cancelled by the division of Z by Y.

It is preferred that the filter 42 corresponding to the smaller of the two color stimuli be disposed in the Z channel, and that the filter 44 corresponding to the larger color stimulus be disposed in the Y channel, to provide an output less than unity from the divider means 54. That is, the smaller value should be divided by the larger value to provide the color ratio signal.

The output line 76 from the divider means 54 is coupled to a speed control circuit 78 which includes a variable time constant circuit means, illustrated herein as a variable resistor 80 serially coupled to a capacitor 82 which in turn is connected to ground. The variable arm of the resistor 80 is connected to a F.E.T. input operational amplifier 84 which precludes errors in the electrical signal by preventing loading of the resistor 80. The output signal from the operational amplifier 84 is introduced, along with a ground 86, to a pair of terminals 88 to provide an analog output signal for recorders, remote meters, and for interfacing with analog oriented process control apparatus.

In some applications it is desirable to average the fluctuations in the color variation of the product. Accordingly, the speed control circuit 78 of previous mention acts as means for averaging the fluctuations in the color ratio signal. This allows a selected time duration to pass before the feedback signals from the control system 46 affect the processing apparatus that is being controlled.

The output of the operational amplifier 84 is also introduced to a plurality of output terminals 90 through an analog-to-digital convertor 92, to provide digital output signals for interfacing the color monitor system 12 with digitally oriented process control apparatus such as, for example, digital computers, and the like (not shown), which control the process plant operations.

The output of the operational amplifier 84 is also delivered to the signal display means 56, which includes meter means 94 for visually monitoring the color ratio output as well as high/low set-point relay means 96 integral therewith to control the operation of the processing apparatus through a plurality of feedback output terminals 98. The feedback output terminals 98 are coupled by a feedback circuit (not shown) to the processing apparatus controls, for example, temperature controls on an oven or other cooker, valve controls in product blending apparatus, and the like. The various output terminals 88, 90, 98 described above correspond accordingly to the output terminal means 58 generally referred to in connection with the discussion of FIG. 1 above.

In accordance with the invention, it is imperative that the signals which are introduced from the photomultiplier tubes 66, 68 to the divider means 54 be in-phase, that is, in synchronism in real time with respect to the viewed area of the product. However, the sensitivity of a photocathode surface (indicated herein by numerals 33, 35 respectively) varies with respect to the position of the light spot impinging the surface, causing a corresponding variation in the output of the tube due only to the position, not the intensity, of the impinging beam. Thus, the outputs of the two photomultiplier tubes 66, 68 are not necessarily "in-phase" when impinged by a light beam, due to the fact that photocathode elements are not physically or photo-optically manufactured with precise and linear sensitivity along their surface lengths and widths. This characteristic is discussed in, for example, RCA publication RCA-1P28A/V1 entitled "Photomultiplier Tube," at pages 4 and 10. However, if the respective outputs from the photomultiplier tubes 66, 68 are not representative of the colors of the same viewed areas of the product at the same instant in time, the division process performed by the divider means 54 provides an erroneous color ratio signal.

The terms "in-phase," "synchronous," and "synchronous in real time," as used herein refer to the relationship between the light energy reflected from the viewed area of the product and the outputs of the two photomultiplier tubes. If the image of the product were merely focused on the photocathodes, then any given nonuniformity in the product as it moved through the viewing area would trace a corresponding path across each of the photocathodes. Nonuniformities of response with respect to location of the impinging image on the photocathodes would then produce erroneous color signals, and correspondingly erroneous color ratio signals. This result is wholly unacceptable where slight variations in color between individual product elements are commonplace and acceptable, or, as with potato chips, even desirable.

Of course, no synchronizing system would be necessary if the photocathode surfaces were uniformly responsive to impinging light, or if the nonuniformities were consistent between different photocathodes. But this is not the case, as is strikingly demonstrated by the RCA-1P28A/V1 publication mentioned above.

It also will be appreciated that the nonuniform responses of different photocathode surfaces is not of great importance when the desired product is uniformly colored, shaped, and sized, because the signal produced in response to a non-uniformity in such a product then is indicative of an undesirable product.

The present invention provides apparatus for sensing slight variations in the overall color of a number of product elements passing through an illuminated viewing area, combining an optical synchronizing system with an optical viewing system. The optical syychronizing system focusses a completely diffused image on the respective photocathode surfaces so that individual variations in product size, shape, orientation, location, or color do not cause variations in the outputs of the respective photomultiplier tubes other than those due to the overall color variation. The diffused images represent the total instantaneous values of the product color integrated over the entire viewed area.

The optical synchronizing system includes the optical synchronizing frame member 30 and the synchronizing lens system 24. The dimensions of the aperture 40 in the optical frame member 30 are selected to focus the impinging light beam images on the respective "regions of best collection" of the photo-cathode elements 33, 35. By combining the optical viewing system with the optical synchronizing system along a single viewing axis, the present inventive combination provides a particularly compact and efficient system for determining the true color ratio of the viewed product with a high degree of sensitivity to color changes.

Figure 4:
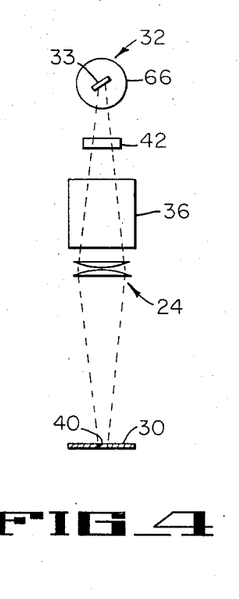
FIG. 4 is a simplified cross-section taken along section lines 4—4 of FIG. 3.

Referring more particularly to FIGS. 3 and 4, there is shown the optical synchronizing system of the invention minus the objective lens system 26 and the optical frame member 28, that is, minus the portion of the optics that forms the image of the viewed product. As noted above, the two photo-multiplier tubes do not always provide an output that is synchronous in real time with respect to the viewed product when struck by light impinging the entire area of their respective photocathode elements. Accordingly, the invention contemplates as aperture 40 in the optical frame member 30 of a size and shape suitable to define an object that, when focused on the photocathode surfaces 33, 35 will produce integrated, or diffuse, images on the corresponding "regions of best collection." Since both the beams introduced to the photoelectric sensors 32, 34 view the same area of the product at the same time, and since their respective integrated images are focused on the "regions of best collection" of the tubes 66, 68, the signals generated by the tubes 66, 68 and delivered to the divider means 54 by the lines 72, 74 are synchronous in real time with respect to the viewed product. In this manner, division of the two color signals produces a ratio signal representing simultaneous instantaneous values of color intensity reflected from the product.

Figure 5:
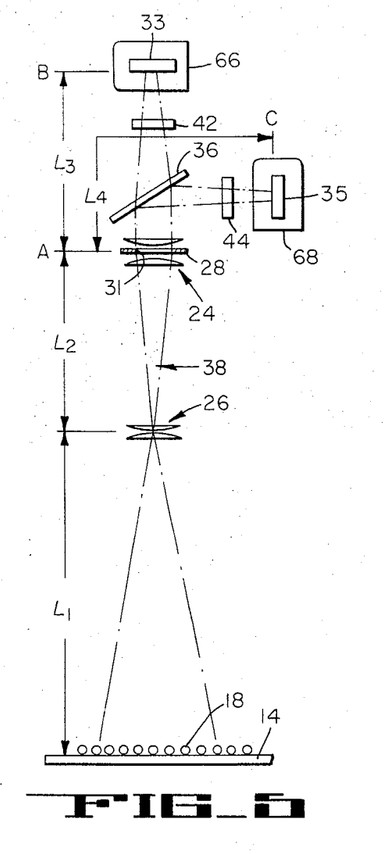
FIG. 5 is a simplified elevation of the optical viewing system which, together with the optics of FIGS. 3 and 4, forms the common viewing and synchronizing optics of the embodiment of FIG. 1.

Referring now to FIG. 5, there is shown the portion of the optical system which determines the optical viewing path 38 and which, in combination with the optical synchronizing (integrating) system of FIGS. 3 and 4, provides common optics for viewing the product while providing synchronous electrical signals indicative of the product color. Light collected by the objective lens system 26 from the product 18 is brought to focus at the image plane A of the synchronizing lens system 24. The area of view of the product 18 is determined by the corresponding area of the aperture in the optical frame member 28 disposed intermediate the two plano-convex lenses of the lens system 24, and may be circular, rectangular, square, or of other desired shape.

In determining the components to be employed in the electro-optical viewing means 22, the optical lengths $L_2$, $L_3$, $L_4$, and the focal length of the synchronizing lens system 24 are determined by the dimensions of the photo-cathodes' regions of best light collection, where the images of the aperture 40 are formed on each photocathode 33 and 35. The focal length of the objective lens system 26 is determined by the distances $L_1$ and $L_2$. As previously mentioned, the size of the optical frame member 30 is selected so as to provide diffuse images on the regions of best collection of the photocathode elements 33, 35. The optical length $L_1$ is determined by the particular application for the system 12, such as, for example, by the distance that process conditions require be maintained between the electro-optical viewing means 22 and the area to be viewed. The size and shape of the aperture in the optical frame member 28 are selected to define a viewed area appropriate to the particular application for the system, considering, for example, the area available to be viewed, the type of product being processed, and the operating conditions of the process.

Figure 6:
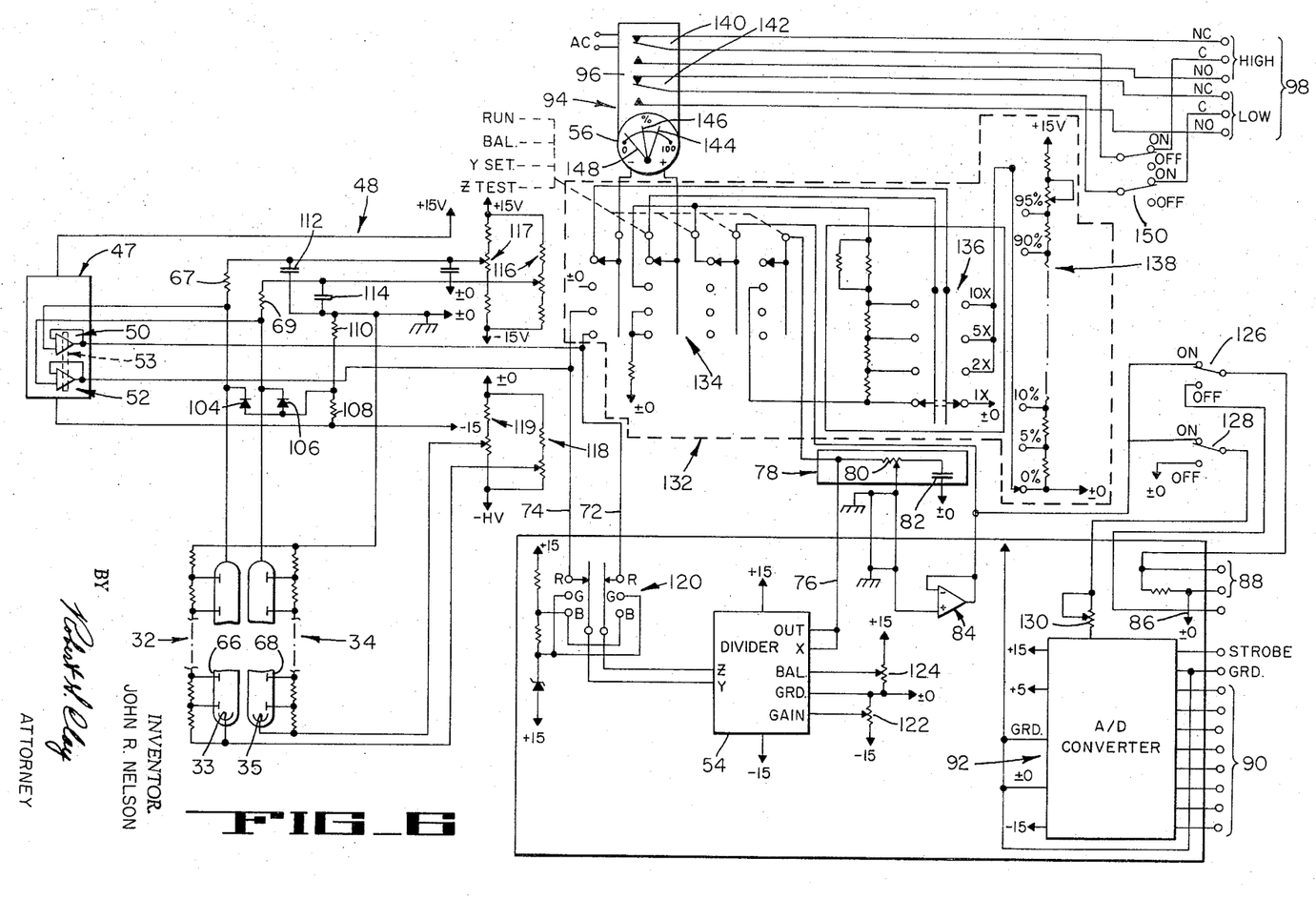
FIG. 6 is a schematic diagram illustrating in detail one embodiment of the electronic computing control system of the invention.

Referring now to FIG. 6, there is shown in detail a schematic diagram of the electronic portion of the electro-optical viewing system 22, together with the electronic computing control system 46. Like components in the circuits of FIGS. 1, 2 and 6 are referred to by the same reference numerals.

The optical path 38 (FIGS. 1–5) impinges the photoelectric sensors 33, 35 to produce the color signals from the respective photomultiplier tubes 66, 68. These outputs are coupled to respective load resistors 67, 69 as well as to the inputs of the F.E.T. input operational amplifiers 50, 52. The load resistors 67, 69 are selected according to the optical signal level from the product being monitored. The photo-multipliers 66, 68 and color filters 42, 44 of FIGS. 1–5 are selected according to the portions of the optical spectrum being used for the product being monitored.

The cathodes of a pair of clamping diodes 104, 106 are respectively coupled to the outputs from the photomultiplier tubes 66, 68. The anodes of the clamping diodes are coupled together and thence to a junction between a pair of resistors 108, 110 which are coupled between −15 volts and ground respectively. Thus diodes 104, 106 provide a clamping action to limit the input to the line driver 47 at 10.1 volts to prevent overdriving the latter. The free ends of the load resistors 67, 69 are coupled to ground through respective by-pass capacitors 112, 114, which prevent stray voltage pickup, and also to respective voltage varying bias networks 117 and 116. The gains of the photomultipliers 66, 68 are controlled by means of respective gain control networks 118, 119. A run-set switch 120 is provided in lines 72, 74, which together with a gain control 122 and a balance control 124 provide means for trimming or setting the divider means 54.

The output from the divider means 54 is fed through the conveyor belt speed control circuit 78 and the F.E.T. input operational amplifier 84 of previous mention to an analog switch 126 coupled to the output terminals 88, and also to a digital switch 128 coupled to the digital output terminals 90 by the analog-to-digital converter 92. The analog-to-digital converter 92 is a conventional converter circuit having the usual power inputs. The analog signal is fed to the converter through a trimming resistance 130.

The output 76 from the operational amplifier 84 is also fed to the signal display means 56 through a scale modifying means 132. The scale modifying means 132 comprises the combination of a function switch 134 coupled to the meter means 94, adjust span switch means 136, and percent offset switch means 138. The function switch 134 allows selection of the switch contacts and circuits for balancing the circuitry during the calibrating process, prior to the operation of the monitor system. Suitable selection of the switch position on the adjust-span switch means 136 changes the scale sensitivity of the meter means 94, while selection of the switch position on the percent offset switch means 138 determines the percentage of scale offset. Thus, the switch means 136, 138 provide the meter means 94 with greater sensitivity over a selected range of meter pointer travel so that even slight deviations in the color ratio signal are readily sensed.

The relay means 96 includes two relays and two sets of contacts, a high set-point relay 140 and a low set-point relay 142. The settings for the contacts of the high and low set-point relays 140, 142 are determined by mechanically positioning corresponding high and low set point controls 152, 145. Such settings are indicated by corresponding high and low set pointers 144, 146 on the meter means 94. In operation, the contacts of the relays 140, 142 are changed as the meter pointer 148 swings past the respective set pointers 144, 146. A relay control output is provided on either of a set of high and/or low relay output terminals 98 by closing the relay circuit through a relay switch 150.

Accordingly, the color monitor system of the present invention provides various types of outputs to adapt the system to specific applications. For example, the relay control output provides high and low set switching in response to the color of the product being monitored, which switching can be employed to control lights, bells, ovens, valves, and the like, to provide a feedback correction circuit. The signal available at the analog output terminals 88 may be utilized, for example, in the continuous recording of results with a chart recorder, or the continuous controlling of cooking temperature, product conveying speed, and other such process controls. The signals available at the digital output terminals 90 may be utilized to control apparatus in digitally oriented processing plants; for example, to introduce digital signals to a computer which in turn controls the cooking oil temperature, conveyor belt speed, oven temperatures, material flow valves, or other process controls.

Figure 7:
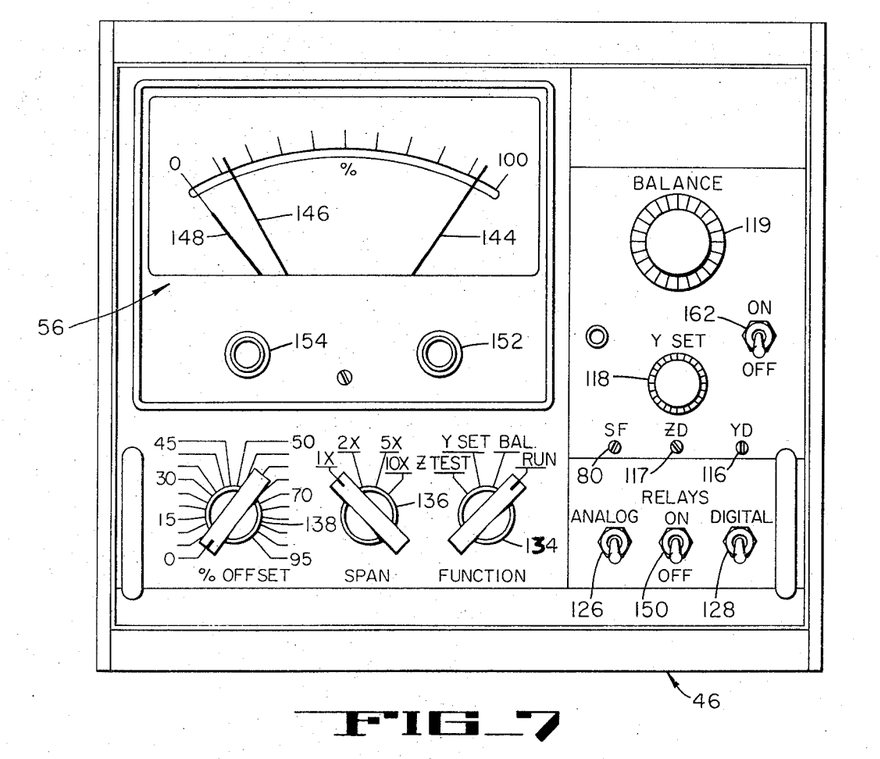
FIG. 7 is a view of the front panel layout for the computing control system of the invention illustrated in FIG. 6, further illustrating the various controls.

Referring now to FIG. 7, the front panel of the electronic computing control system 46 of FIGS. 1 and 2 is shown. The various displays are labeled and will readily be recognized when compared with the circuitry described in FIG. 6. Note that the meter means 94 includes meter set pointers 144, 146, which are manually set in position by respective dials 152, 154 to determine the high and low positions for operating the relays 140, 142.

By way of example only, there are various "calibrating" procedures which it is desirable to perform prior to operating the invention apparatus in the color monitoring of a process. The first calibrating procedure is the "permanent" setting or trimming of the divider means 54, which is accomplished during assembly of the system. Referring to FIGS. 6 and 7, the function switch 134 is set to the "run" position. The adjust span switch 136 is set in the "1X" position and the speed control circuit "SF" (reference numeral 80) is turned clockwise to the "F," or fast, position. The power 162, analog 126, and digital 128 switches are turned on.

The run-set switch 120 (FIG. 6) is set on the "G" position and the gain control 122 (FIG. 6) is adjusted for a 10 volt output at the analog output terminals 88. The switch 120 is then set at the "B" position and the bias control 124 (FIG. 6) is adjusted for the same 10 volt output at terminals 88. The above two steps may be repeated.

Next the run-set switch 120 is set on the "G" position and a fast rise time strobe pulse (of about +2.5 volts) is applied to the "strobe" terminal coupled to the analog-to-digital converter 92 (FIG. 6). The trimming resistor 130 is adjusted for all "ones" output at the digital output terminals 90. The divider means is then permanently set for all operations.

The second "calibrating" procedure involves setting or balancing the electronic computing control system 46 with respect to the specific product being monitored, and selection of the desired scale offset and span settings. To this end, with the electro-optical viewing means 22 installed over the conveyor belt 14, the analog, digital, and relay switches 126, 128, 150 respectively are turned off, and the power switch 162 is turned on (FIGS. 6 and 7). The optical slide 29 (FIGS. 1 and 2) is closed to block all light from the optical system so that no light reaches the photomultipliers 66, 68. With the function switch 134 on "Z test," the ZD control (bias network 117) is adjusted to position the meter pointer 148 on zero. Then with the function switch 134 on "Y set," the YD control (bias network 116) is adjusted to provide a zero setting for the meter pointer 148. The ZD and YD controls set the electrical output for the viewing means 22 equal to the "dark" or "no light" color signal condition.

The optical slide 29 is then opened to allow the viewing means 22 to view an optical reference (not shown) placed at the viewing area. The optical reference typically consists of a plate having a reflectivity value corresponding to that desired for the product being monitored. For example, a "light" product such as potato chips could use an optical reference of the order of 80 percent reflectivity. A "dark" product such as roasted coffee could use an optical reference of the order of 5 percent reflectivity. The function switch 134 is placed in the "Y set" position, and the "Y set" control 118 is adjusted for full output on the meter pointer 148. The function switch is then set to the "balance" position and the Z balance gain control 119 is adjusted for full scale output of meter pointer 148.

It is generally desirable at this point to repeat the "Y set" and "Z balance" steps. The ZD and YD calibrations, which assure dissipation of any of the effects of dark current flow in the photomultiplier tubes 66, 68, are necessary only when the photomultiplier tubes are replaced.

Next the function switch 134 is set on the "run" position and, with the optical reference still in position, the meter pointer 148 should read full scale. The optical reference is then removed and the percent offset switch 138 is set on the percentage setting corresponding to the lowest value expected for the product being monitored. Then the adjust span switch 136 is set in accordance with the range of the product being monitored. The invention system is then ready to perform the above-described monitoring process.

What is claimed is:

1. A system for continuously monitoring the color of a product, comprising means for viewing a selected illuminated area through which a stream of the product is passed, said means for viewing including first optical means for forming a diffuse image representative of the average color of the product passing through the selected area, transducer means including photosensitive elements, and second optical means for simultaneously imaging said diffuse image on said photosensitive elements via first and second light beam paths, said second optical means including means for filtering said first and second light beams at respective wavelengths selected from the optical frequency spectrum, the light energy level of each filtered beam being representative of the average color at the respective wavelength of the product passing through the selected area, said transducer means including means and for continuously generating a pair of electrical color signals representative of the light energy of the respective filtered light beams at said photosensitive elements, and electrical analog dividing means operatively coupled to the transducer means for dividing one of the electrical color signals by the other electrical color signal to provide a continuous color ratio signal functionally related to the instantaneous average color of the product passing through the selected area irrespective of variations in the brightness of the illumination.

2. A system for continuously monitoring the color of a product as claimed in claim 1, in which the first optical means comprises an objective lens system disposed along a selected optical axis having the selected area at its object plane; and the second optical means comprises a synchronizing lens system having the diffuse image at its object plane and beam splitter means disposed along the selected optical axis to provide the first and second light beams.

3. A system for continuously monitoring the color of a product as claimed in claim 2, in which the photosensitive elements have regions of best light collection and in which the size and shape of the diffuse image formed by the objective lens system correspond to the size and shape of the regions of best light collection of the photosensitive elements, the second optical means being arranged so that the diffuse images of the filtered first and second light beams are projected on the regions of best light collection of the respective photosensitive elements.

4. A system for continuously monitoring the color of a product as claimed in claim 2, in which the means for filtering comprises a color filter arranged in the path of each light beam between the beam splitter means and the respective photosensitive element.

5. A system for continuously monitoring the color of a product as claimed in claim 1, including output circuit means operatively coupled to the analog dividing means to provide an output signal functionally related to the instantaneous average color of the product passing through the selected area.

6. A system for continuously monitoring the color of a product as claimed in claim 5, including calibration means operatively coupled to the analog dividing means for setting a reference color ratio corresponding to the desired color reference for the product, and in which the output circuit means includes means for comparing the color ratio signal with the reference color ratio set by the calibration means and generating an output signal indicative of the difference between the average color of the product passing through the selected area and the desired color thereof.

7. A system for continuously monitoring the color of a product as claimed in claim 5, including output display means for indicating the color ratio signal.

8. A system for continuously monitoring the color of a prod;uct as claimed in claim 7, in which the output display means includes high-low set point relay means for providing an output signal responsive to the color ratio signal increasing above and decreasing below the respective high-low set point thereof.

9. A system for continuously monitoring the color of a product as claimed in claim 5 in which the output circuit means includes an analog-to-digital converter for providing a digital output functionally related to the instantaneous average color of the product passing through the selected area.

10. A method of continuously monitoring the color of a product, comprising the steps of defining a selected area to be viewed, illuminating the selected area, passing a stream of the product through the selected area, forming a first optical path having the selected area as its object and a diffuse image representative of the average color of the product passing through the selected area, forming a second optical path having the diffuse image as its object, splitting the second optical path into first and second diffuse light beams, filtering the first and second light beams at selected wavelengths within the optical frequency spectrum, simultaneously sensing the light energy of the diffuse images of the respective filtered light beams, continuously generating first and second electrical color signals representative of the light energies of the diffuse images of the respective first and second light beams, and dividing one of the electrical color signals by the other electrical color signal to produce a continuous color ratio signal functionally related to the instantaneous average color of the product passing through the selected area irrespective of variations in brightness of the illumination.

11. A method of continuously monitoring the color of a product as claimed in claim 10, in which the second optical path is formed coaxial with the first optical path.

12. A method of continuously monitoring the color of a product as claimed in claim 10 in which the size and shape of the diffuse image correspond to the size and shape of regions of best light collection of photosensitive transducer elements which sense the light energy of the diffuse images of the respective first and second light beams and generate the first and second electrical color signals, and in which the step of sensing includes imaging the first and second light beams on the region of best light collection of the respective photosensitive transducer elements.

13. A method of continuously monitoring the color of a product as claimed in claim 10 further including the step of comparing the color ratio signal with a predetermined signal value representative of the desired average color of the product to determine variations between the average color of the product passing through the selected area and the desired color thereof.

14. A method of continuously monitoring the color of a product as claimed in claim 10 further including the step of displaying the color ratio signal.

15. A method of continuously monitoring the color of a product as claimed in claim 10 further including the step of generating control signals indicative of variations of the color ratio signal corresponding to variations in the color of the product passing through the selected area.

* * * * *